US005471891A

United States Patent [19]

Chen

[11] Patent Number: 5,471,891

[45] Date of Patent: Dec. 5, 1995

[54] MUSIC BOX ORNAMENT TRANSMISSION MECHANISM

[76] Inventor: Corrina Chen, 8Fl., No. 185, Yung Chi Road, Taipei, Taiwan

[21] Appl. No.: 165,452

[22] Filed: Dec. 13, 1993

[51] Int. Cl.$^{6}$ .............................. F16H 21/16; G10F 1/06

[52] U.S. Cl. .................................. 74/45; 74/50; 446/298; 40/455; 84/95.1; 84/95.2

[58] Field of Search .................................... 84/95.1, 95.2; 40/455; 446/298; 74/45, 50

[56] References Cited

U.S. PATENT DOCUMENTS

| | | | |
|---|---|---|---|
| 5,081,899 | 1/1992 | Hou et al. | 84/95.2 |
| 5,088,373 | 2/1992 | Hou | 84/95.2 |
| 5,161,420 | 11/1992 | Feng | 84/95.2 |

FOREIGN PATENT DOCUMENTS

| | | | |
|---|---|---|---|
| 473183 | 3/1929 | Germany | 84/95 |

*Primary Examiner*—Charles A. Marmor
*Assistant Examiner*—David Fenstermacher
*Attorney, Agent, or Firm*—Jones, Tullar & Cooper

[57] ABSTRACT

A music box ornament transmission mechanism includes a crankshaft having one end coupled to the output shaft of a driving mechanism of a music box and an opposite end coupled with a crankpin. A rocker has a supporting end turned in a hole on a rib above the bottom cover of the music box and a free end hung on the crankpin and linked to a tappet rod at the bottom of an ornament, wherein when the crank shaft is rotated by the driving mechanism of the music box, the rocker is driven to impart alternating vertical movements to the ornament.

3 Claims, 4 Drawing Sheets

MUSIC BOX ORNAMENT TRANSMISSION MECHANISM

BACKGROUND OF THE INVENTION

The present invention relates to a transmission mechanism which can be driven by a rotary device to impart alternating vertical movements to an ornament.

A variety of music boxes are known and have appeared on the market. These music boxes commonly use a transmission mechanism coupled to the driving mechanism thereof to turn an ornament. U.S. Pat. No. 4,890,828 discloses an ornamental display assembly which comprises a plurality of ornaments supported on a base within which a wind-up music box mechanism is mounted for imparting rotational movement to a first ornament in driving engagement with a wind-up shaft of the mechanism, and alternating vertical movements to second and third ornaments supported on taper rods engaged by a pair or offset eccentric cam members mounted on a drive shaft driven by the mechanism. U.S. Pat. No. 4,939,944 discloses a transmission mechanism for a music box ornament according to which the power output of the music box is transmitted to an ornament supported thereon, wherein the output shaft of the music box rotates an eccentric stub that is engaged within a slide link supported for vertical movement on a pair of guide rods. The ornament is supported by a tappet rod having a lower end secured to either the slide link or the drive stub, so that operation of the music box will impart the desired movement to the ornament.

SUMMARY OF THE INVENTION

The present invention provides an improved transmission mechanism structure which can be driven by the rotary output power of a music box to impart alternating vertical movements to an ornament.

According to a preferred embodiment of the present invention, the transmission mechanism comprises a crankshaft coupled to the output shaft of the driving mechanism of a music box, and a rocker coupled to the crankpin of the crankshaft and driven to impart alternating movements to a tappet rod at the bottom of an ornament. There is also provided a connecting device linked between the tappet rod and the free end of the rocker. The connecting device has a screw rod at the top threaded into a bottom screw hole on the tappet rod, and a retaining notch on the periphery thereof which receives the free end of the rocker.

DETAILED DESCRIPTION OF THE PREFERRED EMBODIMENT

Figure 1:
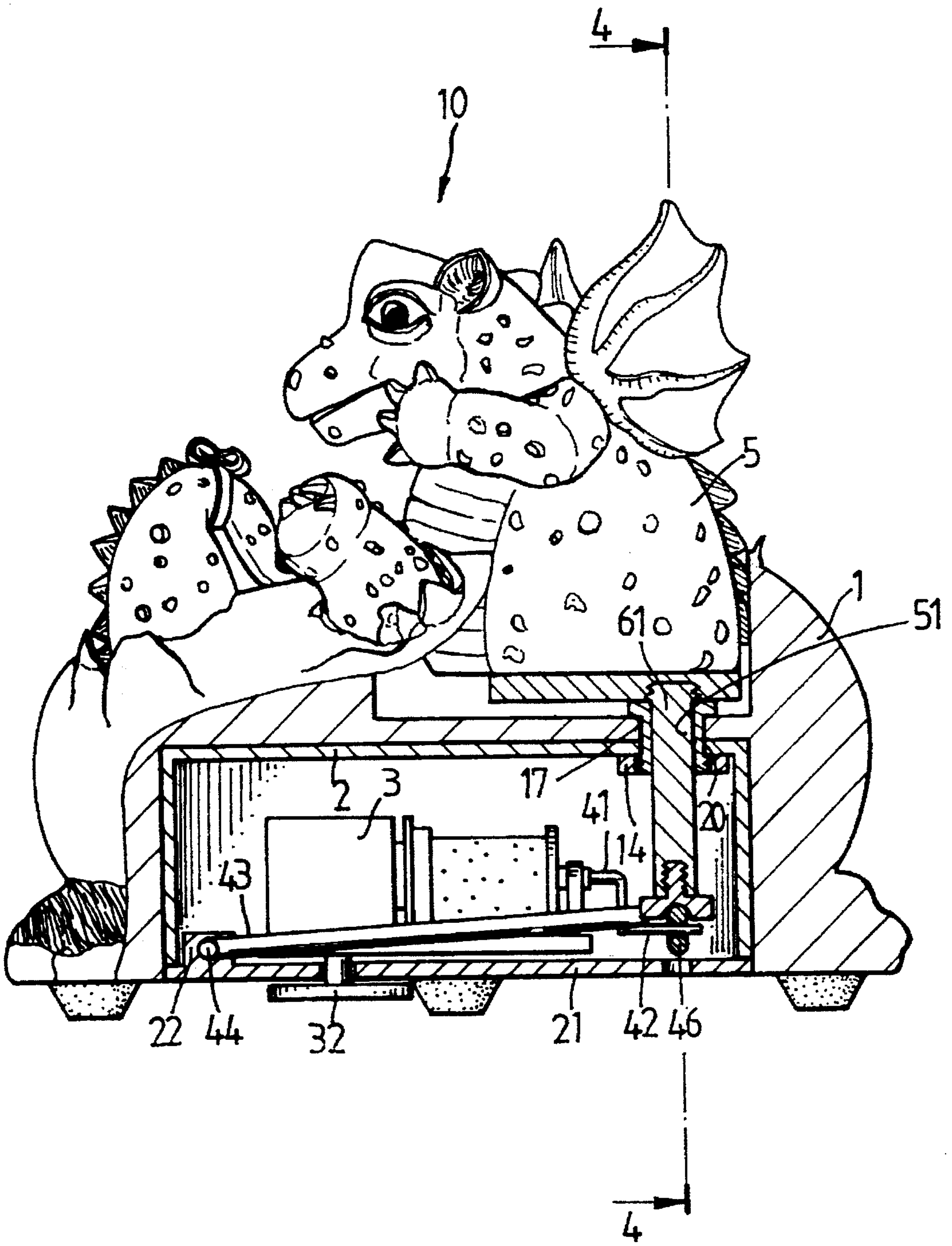
FIG. 1 is a sectional view of a music box according to the present invention, showing the arrangement of the internal mechanism.
Figure 2:
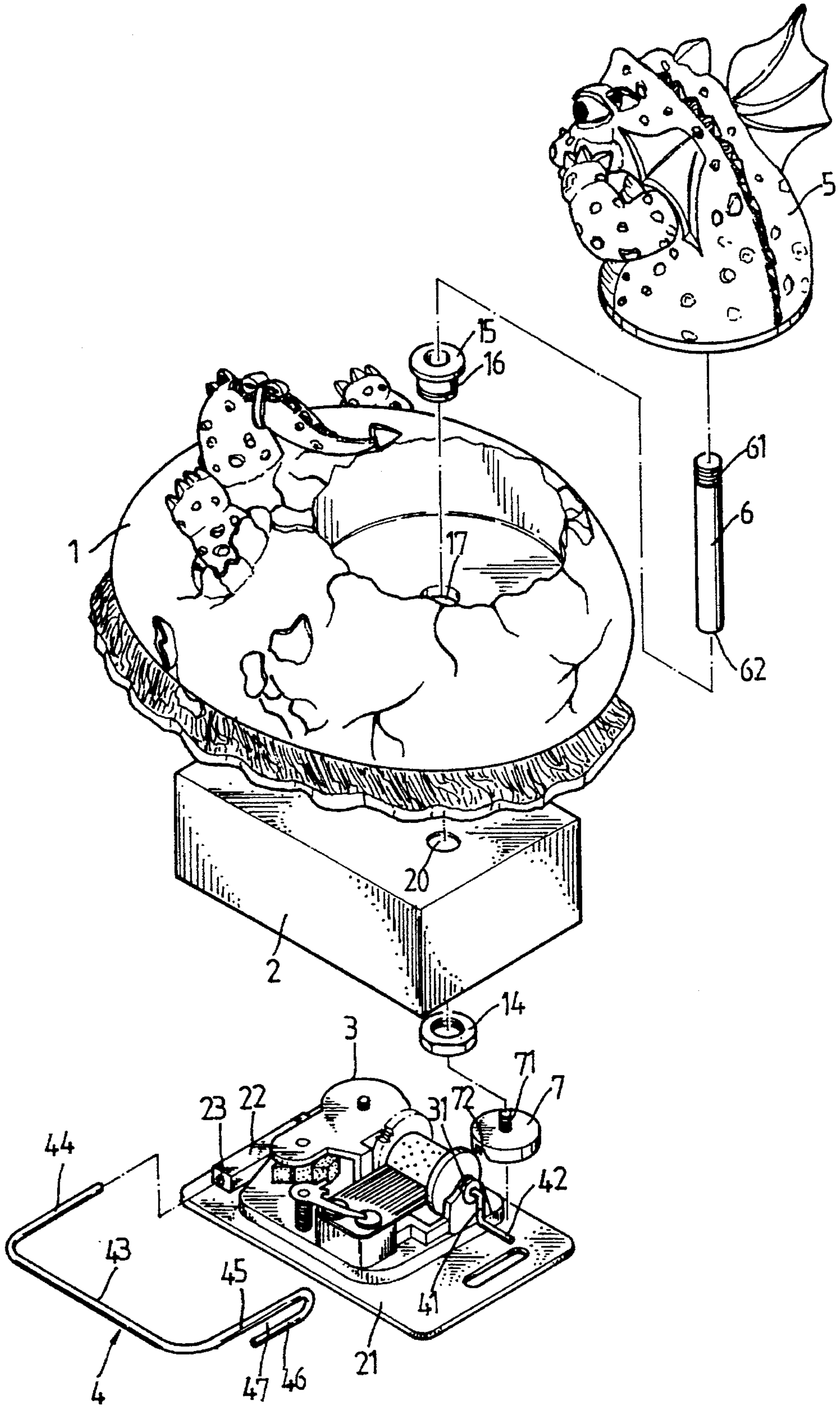
FIG. 2 is all exploded view of the music box shown in FIG. 1.

Turning now to the annexed drawings in detail and referring first to FIGS. 1 and 2, a music box, 10, comprises a hollow base 1 to which a box 2 is mounted in an internal space. The box 2 has a power source 3 and a transmission mechanism 4 mounted therein, and an ornament 5 mounted externally thereof by a tappet rod 6 mounted in the box 2 and extending outwardly thereof. The ornament 5 is disposed outside the base 1 and linked to the transmission mechanism 4 by the tappet rod 6. The power source 3 reproduces music mechanically when activated by a clock thereof. The transmission mechanism 4 is coupled to the power source 3 and driven to impart alternating vertical movements to the tappet rod 6, causing the ornament 5 to reciprocate. The base 1 is shaped like a broken eggshell. The ornament is shaped like a new born dinosaur emerging from the broken egg shell, namely, the base 1. Of course, the base 1 and the ornament 5 can be made of any desired shape.

Figure 3:
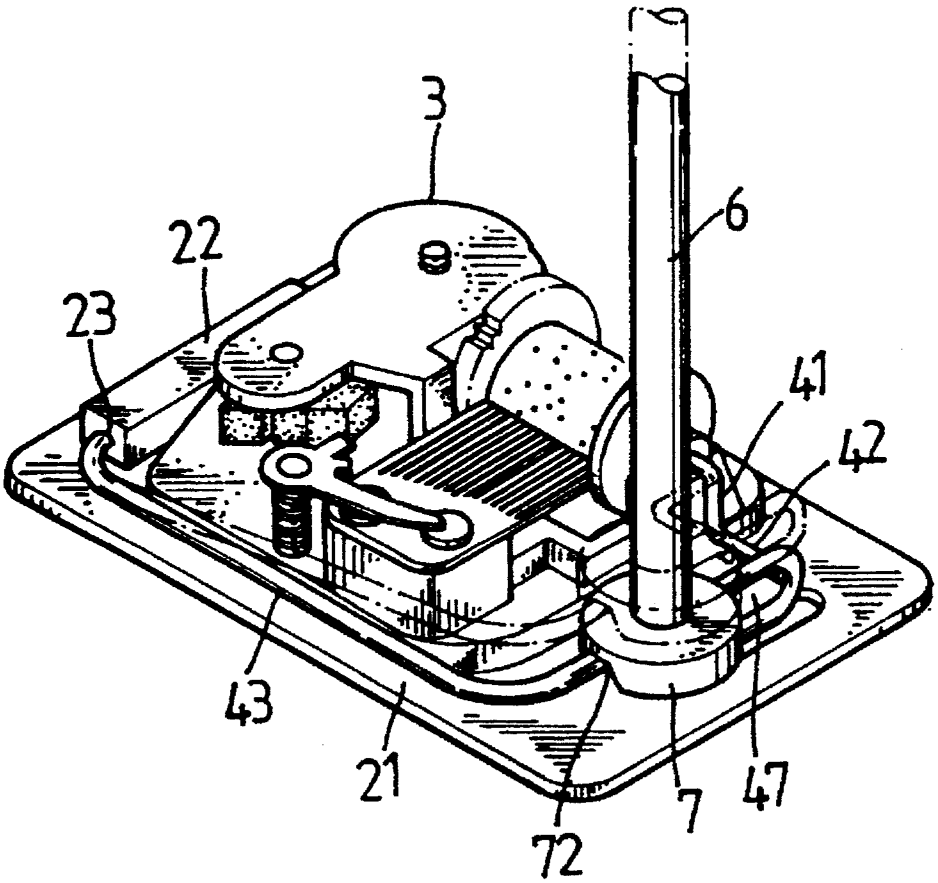
FIG. 3 is an elevational view of a transmission mechanism for the music box shown in FIG. 1.

Referring to FIG. 3 and FIG. 2 again, the transmission mechanism 4 comprises a crankshaft 41 having one end coupled to the power output shaft 31 of the power source 3 and an opposite end which terminates in a crankpin 42 linked to a rocker 43. The rocker 43 is made of a substantially U-shaped rod having a front end 44 revolvably inserted into a hole 23 on a rib 22, and a rear end, namely, the free end 45 extended over the crankshaft 41 and then turned backwards through a 180° angle and terminates in to a tip 46 defining a sliding way 47 between the tip 46 and the free end 45, together defining a bent portion. The power source 3 is supported on the bottom cover 21 of the box 2. The rib 22 is integrally molded on the bottom cover 21 of the box 2 at one side opposite to the power output shaft 31.

Figure 4:
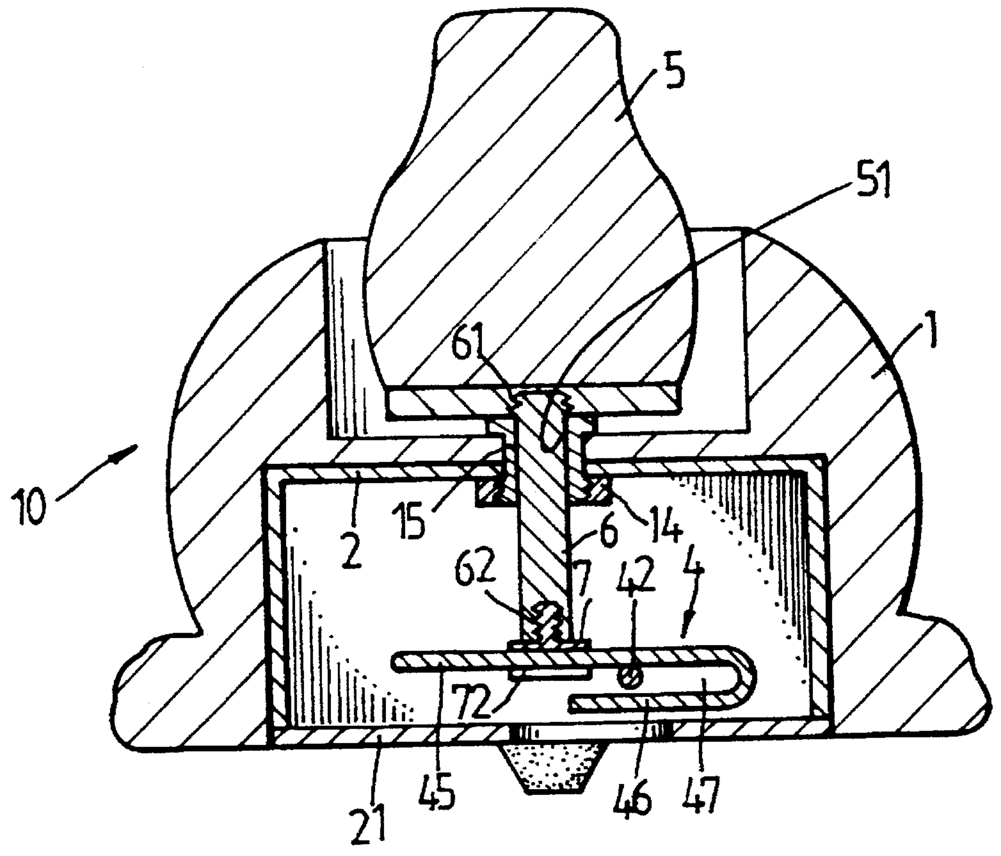
FIG. 4 is a sectional view taken along line 4—4 of FIG. 1.

Referring to FIG. 4 and FIG. 2 again, the tappet rod 6 is made to slide in a sleeve 15. The sleeve 15 comprises an outer thread 16 around the reduced bottom end thereof inserted through a hole 17 on the base 1 and a hole 20 in the box 2 and then threaded into a nut 14 being affixed to the inside top surface of the box 2. The tappet rod 6 has an outer thread 61 around the top end thereof threaded into an inner thread 51 on the bottom of the ornament 5, and an inner thread 62 on the bottom end thereof connected to the free end 45 of the rocker 43 by a connecting device. The connecting device 7 comprises a short screw rod 71 at the top threaded into the inner thread 62 on the tappet rod 6, and a retaining notch 72 on the periphery thereof which receives the free end 45 of the rocker 43.

Referring to FIG. 1 again, when the handle 32 of the music box 10 is turned to activate the clockwork of the power source 3, the output shaft 31 is turned to drive the crankshaft 41, causing the rocker 43 to rock back and forth, and therefore the ornament 5 is reciprocated vertically by the rocker 43 via the tappet rod 6.

While only one embodiment of the present invention has been has been shown and described, it will be understood that various modifications and changes could be made without departing from the spirit and scope of the invention.

What is claimed is:

1. A transmission mechanism for a music box ornament, comprising:

a driving mechanism having an output shaft;

a crankshaft having one end coupled to the output shaft of the driving mechanism and an opposite end defining a crankpin;

a tappet rod connected at one end to an ornament and at its other end to said crankpin;

a rocker formed as a U-shaped rod having a supporting end to support the movement of said rocker and a free end connected to said crankpin and linked to said tappet rod at the crankpin end; and a music box bottom, cover, wherein said free end of said rocker comprises a bent portion defining a slide way to confine the movement of said crankpin, wherein the supporting end of said rocker is inserted in a hole on a rib formed on said bottom cover onto which the driving mechanism is supported, wherein said rib is directly molded on said bottom cover, and wherein when said crankshaft is rotated by the driving mechanism, said rocker is driven by said crankpin to impart alternating vertical movements to said tappet rod causing said ornament to be moved alternatively up and down.

2. The transmission mechanism for a music box ornament of claim 1, further comprising a connecting device connected between said tappet rod and the free end of said rocker.

3. The transmission mechanism for a music box ornament of claim 2 wherein said tappet rod has a bottom screw hole and said connecting device comprises a screw rod threaded at its top end into the bottom screw hole on said tappet rod, and a retaining notch which receives the free end of said rocker.

* * * * *